United States Patent
Zhou

(10) Patent No.: US 10,999,208 B2
(45) Date of Patent: *May 4, 2021

(54) HANDLING PATH ISSUES FOR STORAGE COPY SERVICES

(71) Applicant: INTERNATIONAL BUSINESS MACHINES CORPORATION, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,883

(22) Filed: May 21, 2019

(65) Prior Publication Data

US 2019/0273692 A1 Sep. 5, 2019

Related U.S. Application Data

(63) Continuation of application No. 15/335,827, filed on Oct. 27, 2016, now Pat. No. 10,341,247.

(51) Int. Cl.
*G06F 13/20* (2006.01)
*H04L 12/801* (2013.01)
(Continued)

(52) U.S. Cl.
CPC .............. *H04L 47/34* (2013.01); *G06F 13/20* (2013.01); *H04L 43/0858* (2013.01);
(Continued)

(58) Field of Classification Search
CPC ..... H04L 47/34; H04L 43/0858; H04L 43/16; H04L 45/121; H04L 45/22; H04L 45/70; G06F 13/20
See application file for complete search history.

(56) References Cited

U.S. PATENT DOCUMENTS

| 7,096,269 B2 | 8/2006 | Yamagami |
| 7,668,981 B1 * | 2/2010 | Nagineni ............ H04L 67/1097 710/38 |

(Continued)

FOREIGN PATENT DOCUMENTS

CA 2548866 A1 7/2005

OTHER PUBLICATIONS

IBM, "Monitoring Storage Paths," IBM Knowledge Center, p. 1, DB2 Version 9.8 for Linux, UNIX, and Windows, https://www.ibm.com/support/knowledgecenter/SSEPGG_9.8.0/com.ibm.db2.luw.admin.dbobj.doc/doc/r0024235.html, Accessed on Aug. 18, 2016.

(Continued)

*Primary Examiner* — Viet D Vu
(74) *Attorney, Agent, or Firm* — L. Jeffrey Kelly

(57) ABSTRACT

A method for determining path health to conduct a plurality of Input-Output (IO) operations along a healthy path in a network is provided. The present invention may include receiving an IO request from a user and sending the received IO request on a first path. The present invention may include determining a first IO response has exceeded a threshold time on the first path. The present invention may include determining the first path has degraded based on the exceeded threshold time. The present invention may include generating a duplicate IO request and sending on a second path. The present invention may include receiving the duplicated IO response before receiving the original IO response. The present invention may include determining a health state associated with the slower path. The present invention may include refreshing a path state machine based on the determined health state associated with the slow path.

20 Claims, 8 Drawing Sheets

(51) Int. Cl.
*H04L 12/26* (2006.01)
*H04L 12/727* (2013.01)
*H04L 12/707* (2013.01)
*H04L 12/721* (2013.01)

(52) U.S. Cl.
CPC ............ *H04L 43/16* (2013.01); *H04L 45/121* (2013.01); *H04L 45/22* (2013.01); *H04L 45/70* (2013.01)

(56) References Cited

U.S. PATENT DOCUMENTS

| | | | |
|---|---|---|---|
| 7,937,448 | B2 | 5/2011 | Yamagami et al. |
| 8,037,171 | B2 | 10/2011 | Burton et al. |
| 8,447,730 | B1 | 5/2013 | Mortazavi et al. |
| 8,619,555 | B2 * | 12/2013 | Dallas ................ G06F 11/2005 370/228 |
| 8,711,684 | B1 | 4/2014 | Usgaonkar et al. |
| 8,954,808 | B1 | 2/2015 | McLean et al. |
| 9,858,102 | B2 | 1/2018 | Khemani et al. |
| 2005/0278465 | A1 | 12/2005 | Qi |
| 2008/0301492 | A1 | 12/2008 | Honda |
| 2009/0028064 | A1 | 1/2009 | Elmasry et al. |
| 2009/0052466 | A1 | 2/2009 | Khalid et al. |
| 2009/0109851 | A1 * | 4/2009 | Li ..................... H04W 72/1231 370/235 |
| 2010/0020817 | A1 | 1/2010 | Ebisuzaki |
| 2012/0124414 | A1 | 5/2012 | Dallas et al. |
| 2018/0123923 | A1 | 5/2018 | Zhou |
| 2018/0145894 | A1 | 5/2018 | Zhou |

OTHER PUBLICATIONS

Mell et al., "The NIST Definition of Cloud Computing," National Institute of Standards and Technology, Sep. 2011, p. 1-3, Special Publication 800-145.

Pending U.S. Appl. No. 16/381,590, filed Apr. 18, 2019, entitled: "Handling Path Issues for Torage Copy Services", 38 pages.

IBM: List of IBM Patents or Patent Applications Treated as Related (Appendix P), Jun. 5, 2019, 2 pages.

* cited by examiner

HANDLING PATH ISSUES FOR STORAGE COPY SERVICES

BACKGROUND

The present invention relates generally to the field of computing, and more particularly to storage copy services.

Generally, data is mirrored to another storage location over networks for data to be quickly recovered in the event of interruption. A mirror site replicates the original site and is typically updated frequently to match the original site. Mirror sites can also allow for faster access to data from a geographically distant location. For instance, if an original site is located thousands of miles away from the customer accessing the data, a mirrored site closer in proximity could offer the same data at a faster speed.

SUMMARY

Embodiments of the present invention disclose a method, computer system, and a computer program product for determining path health to conduct a plurality of Input-Output (IO) operations along a healthy path in a network is provided. The present invention may include receiving an original IO request from a user. The present invention may also include sending the received original IO request on a first path from a primary site to a secondary site. The present invention may then include determining a first IO response associated with the sent original IO request has exceeded a threshold time on the first path between the primary site and the secondary site. The present invention may further include determining the first path has degraded between the primary site and the secondary site based on determining that the first IO response has exceeded the threshold time. The present invention may also include generating a duplicate IO request based on the received original IO request. The present invention may then include sending the generated duplicate IO request on a second path. The present invention may further include receiving a second IO response associated with the sent duplicate IO request on the second path. The present invention may also include receiving the first IO response associated with the original IO request on the first path. The present invention may then determine that the first IO response was received on the first path after the second IO response was received on the second path. The present invention may further include determining a health state associated with the first path based on determining that the first IO response was received on the first path after the second IO response was received on the second path. The present invention may also include refreshing a path state machine based on the determined health state associated with the first path.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
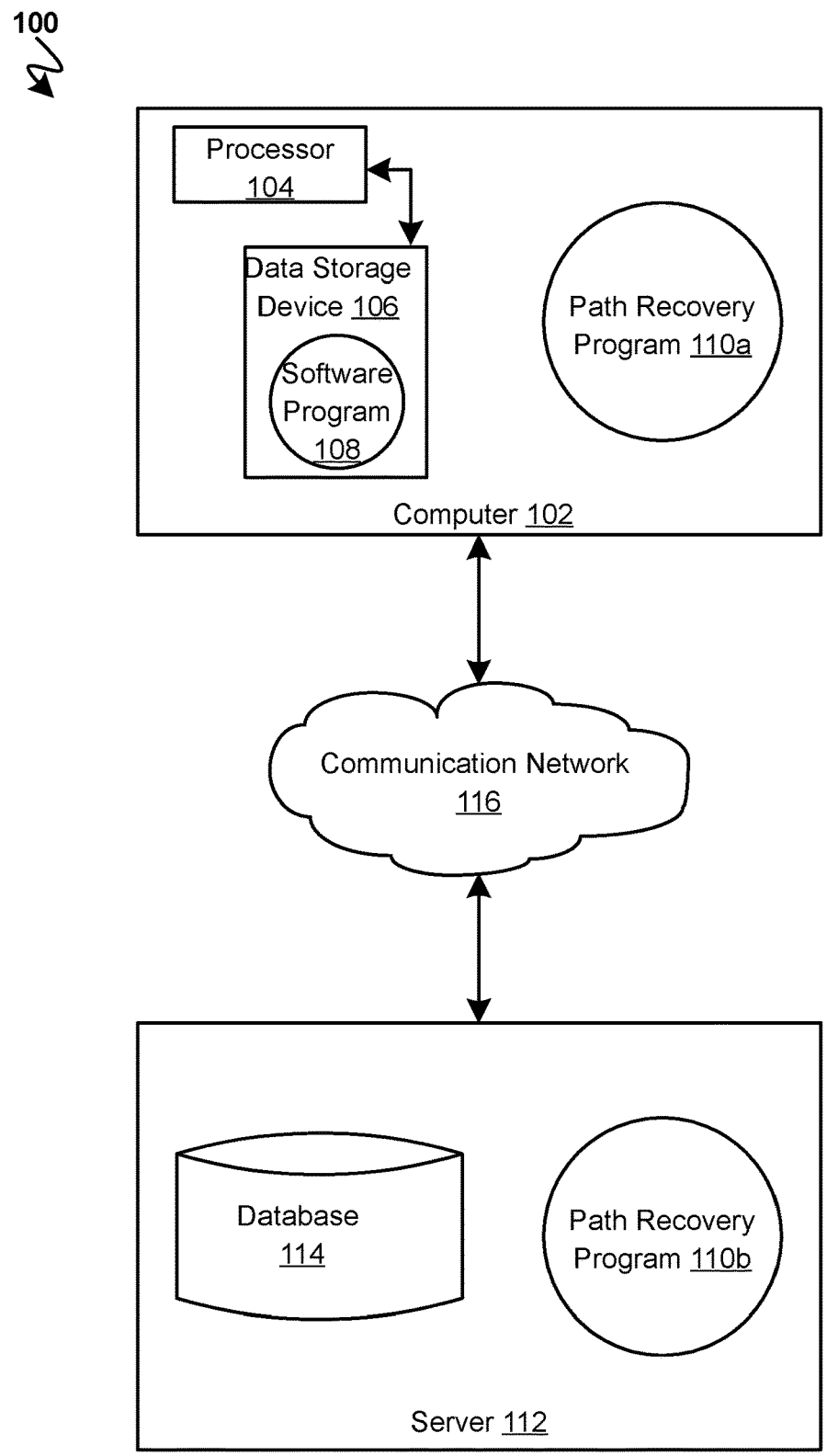
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product relating to path health response processes. As such, the present embodiment has the capacity to improve the technical field of storage copy services by providing a method that measures the health state of a path by comparing the latency between paths to determine if a path has degraded. A path state machine corresponding to each path may be used to indicate the state of a path. More specifically, a latency calculation may be used to measure the latency on a path for the same uniquely numbered IO request sent along two different paths between the primary storage device and the secondary storage device by comparing the degraded path with another good path. Finding latency on a degraded path may allow a slower path to be avoided by sending the duplicate mirrored IO request using a healthy faster path. By detecting a problem path between a primary and secondary site and duplicating the IO operation to send on a faster path, the data storage system may perform optimally and allow customers to not be impacted by a slow path.

As described previously, generally data is mirrored to another storage location over networks for data to be quickly recovered in the event of interruption. A mirror site replicates the original site and is typically updated frequently to match the original site. Mirror sites can also allow for faster access to data from a geographically distant location. For instance, if an original site is located thousands of miles away from the customer accessing the data, a mirrored site closer in proximity could offer the same data at a faster speed.

Currently, if there is a problem on the network between the primary site and the secondary site, the performance of the whole system may deteriorate. A current typical method for detecting path failure may be to use a threshold to identify the health state of one path and when the path's health state exceeds the threshold, the path may be suspended. During this suspended period, the workload may not be cut off, rather the workload may be reduced on that path while the path is still being used. This may create an inability for the local site to detect whether the slowness is a path issue or if the slowness is due to bad performance of the remote site's storage system.

When a path has exceeded the threshold and the path is in a degraded state, the data may still be transferred on this path and during this period the performance impact may be apparent to the customer. Further, once the path is set to a degraded state, there may be no method to recover the path automatically. Although the path slowness may be caused by a transient event (e.g., adapter reset or code upgrade), the path may not automatically recover once the path has failed. Therefore, it may be advantageous to, among other things, provide a way to automate path recovery when a path has degraded to ensure optimal performance over a multi-path network.

According to at least one embodiment, recovery action may be taken at the first instance of a path failure which can minimize the impact of a degraded IO path to the customer. The health state of one path may be measured by using an Exponential Moving Average (EMA) calculation which can indicate the relative state of path health between one path and all other paths in the system. An EMA comparison may be based on the latency on a path for the same IO, which can eliminate the impact of other components in the system, such as backend drive impact or time difference impact.

A path state machine may be used to identify the path health of a path to keep optimal performance on a network when one path becomes degraded. When a path becomes degraded, a duplicate IO request (e.g., a write request) may be sent using another good path while the original IO request is on the degraded slower path. Thus, from an application level, there may be no performance impact when one path is degraded. Data consistency may not be harmed on the secondary site if the same IO request is repeated more than one time. Each IO request may have a unique sequence number for identification, therefore, on the primary site, when the second IO response comes back, the primary site drops the IO response without harm since the IO operation had already been performed.

Performance may be maintained when a path fails by taking action at the first indication of failure by duplicating and sending the unique sequence numbered IO request using another good path. The health state along the path may be measured using the latency responses of the same IO requests sent along two different paths. Detecting and correcting degraded paths may eliminate the impact to other components (e.g., backend Redundant Array of Inexpensive Disks (RAID) overload for some specific IO). Additionally, paths may be automatically recovered after a transient error.

The system threshold path states can be represented by using a path state machine for each path. The path state machine can show whether the path is in a good, degraded or suspended state. The path state may be detected based on system threshold differences such as when the path times-out and through latency calculations. Time-out can occur when the latency of the application for one IO operation exceeds a threshold period (e.g., 2 seconds for an Online Transaction Processing (OLTP) application). Thus, the 2 second latency can show that the path is performing poorly and can be put into a degraded path state. Thereafter, another IO path may be chosen for the duplicate IO operation, allowing the degraded path to be bypassed by sending the IO request using another path.

A path may transition from a degraded state to a good state when an IO response on a path has exceed a predefined percentage (e.g., 95%) within a time window (e.g., 3 minutes) and when no time-out occurred on the path for a specific period of time (e.g., 5 minutes). The latency recovery for the path state machine to transition from a degraded state to a good state may be calculated using the Exponential Moving Average (EMA) value for latency. Latency recovery may occur, for example, when the EMA latency value drops to near 100% (e.g., 110%) and at least a certain number of IO operations are monitored (e.g., 500 IO operations), then the path can be recovered to a good state. A 100% EMA value for a number of continuous IO request operations can show that the path has nearly the same latency compared to other paths, thus the path may be determined to be in a good state. Upon determining another IO operation time-out has occurred, the EMA calculation may be used again to determine path state.

The current health state indicated by a path state machine may transition from a degraded state to a suspended state when the EMA value has been above a threshold (e.g., 200%) for a period of time. Once a path is in a suspended state, physical repair (e.g., a reboot) may be required for the path to transition back to a good state.

The EMA calculation value may assist in checking the state of a path. When determining the EMA value to check whether a path state has transitioned from a degraded state to a good state, a latency comparison may be used to compare the latency of the degraded path with the latency of another good path for the same IO request. The latency comparison may be referred to as Latency Index, where one such calculation can be shown by the following:

$$\text{LatencyIndex} = \text{latency\_on\_degrade\_path} / \text{latency\_on\_good\_path}.$$

A decision window may monitor the number of IO operation requests (e.g., N requests) to show the path state stability for a period of time. Finally, the following EMA calculation may be used to calculate an EMA value to avoid spike issues:

$$EMA_{new} = \alpha * \text{LatencyIndex}_{new} + (1-\alpha) * EMA_{now}$$

where $\alpha = 2/(N+1)$ and N may be the count of IO operations that may be monitored before determining the adjustment of the path state.

When all the paths have the same performance or health state, the EMA may be 100%, however, a reasonable real world deviation may define the threshold EMA to be approximately 110%, allowing a tolerance of approximately 10% performance deviation among the paths. The EMA calculation may also be considered for measuring when a path is not functional and may not be recovered. The threshold EMA may be set at a higher value than 100% (e.g., 200% which is two times worse) for a specified number of continuous IO requests.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a path recovery program 110a. The networked computer environment 100 may also include a server 112 that is enabled to run a path recovery program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the path recovery program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the path recovery program 110a, 110b (respectively) to send and receive IO operations timely in the event of path failure. The path recovery program 110a, 110b has the capability of determining the path health to ensure the IO operations are not slowed down even if one path is not performing optimally. The path recovery method is explained in more detail below with respect to FIGS. 2-4.

Figure 2:
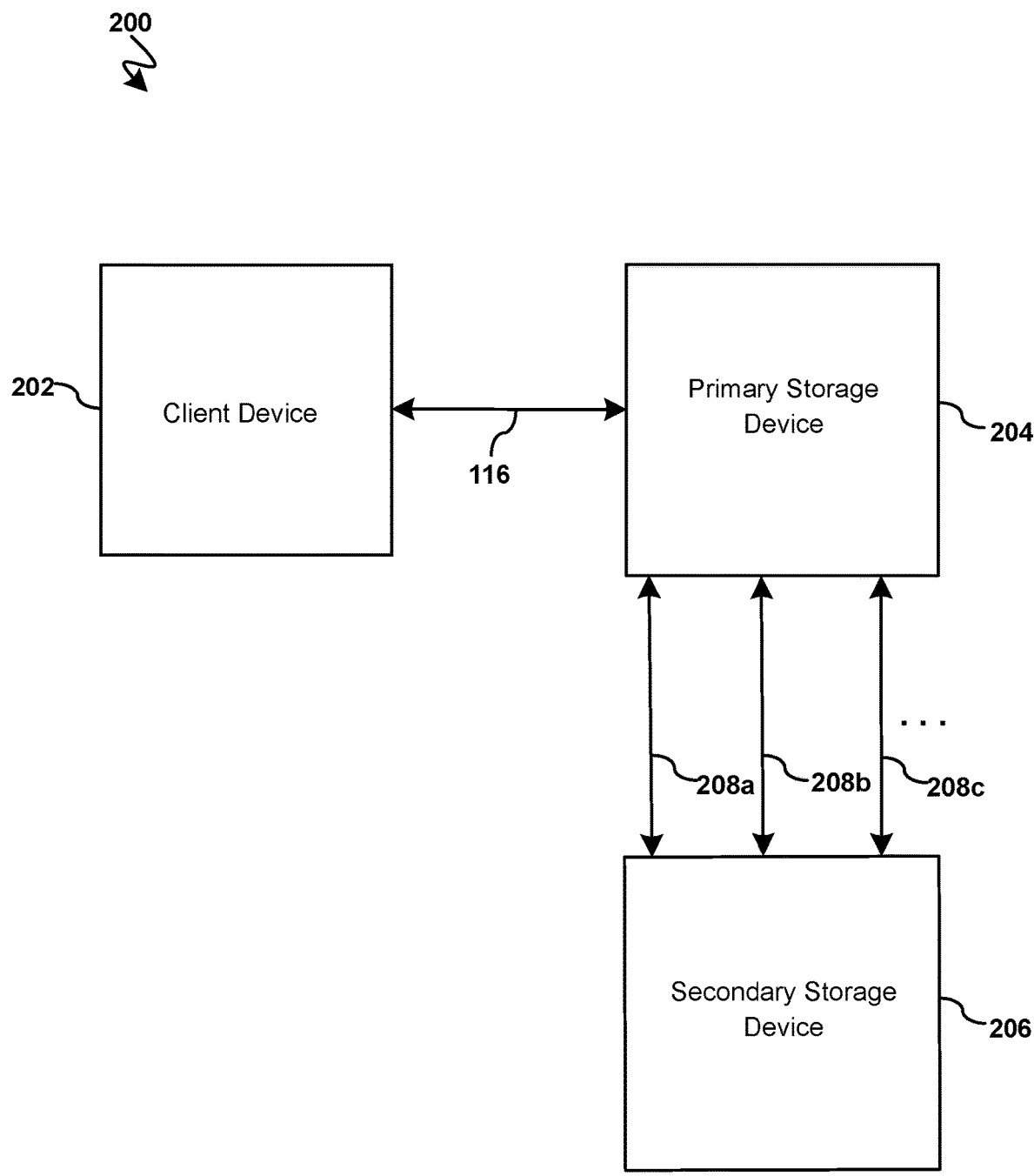
FIG. 2 illustrates a system block diagram of a system network illustrating connections between a client device, a primary storage device and a secondary storage device according to at least one embodiment.

Referring now to FIG. 2, a system block diagram illustrating a system network 200 according to at least one embodiment. The system network 200 may include the client device 202 (e.g., client computer 102) capable of sending and receiving IO operations, a primary storage device 204 and a secondary storage device 206.

The client device 202 may transmit an IO operation to the primary storage device 204 via a communication network 116. The primary storage device 204 (e.g., server 112) may include a path recovery program (e.g., 110b). The primary storage device 204 may send IO operations to and receive IO operations from the secondary storage device 206 (e.g., server 112). The primary storage device 204 may also be connected to a secondary storage device 206 via a communication network 116 using multiple IO paths 208a-208c within the system network 200.

The secondary storage device 206 may act as a mirror to the primary storage device 204 by performing the same IO operations on identical data as the primary storage device 204. The secondary storage device 206 may be used as a data mirror in a storage environment to achieve high availability of data to a customer. A data mirror may be used between two different storage systems, such as primary storage device 204 and secondary storage device 206, in different locations. In order to keep the data consistent between the primary storage device 204 and the secondary storage device 206, the mirrored system may be synchronized. For example, when writing data on a synchronized system, the operation may be complete on both systems before the customer can acknowledge the data. Since the distance between the primary device 204 and the secondary device 206 may be far, the distance between the primary storage device 204 and the secondary storage device 206 may contribute to the latency of the network and the response time to the customer.

The path recovery program (e.g., 110b) running on the primary storage device 204 may calculate and analyze which path 208a-c the IO request should use to increase efficiency for the client using the client device 202. The path recovery program (e.g., 110b) may duplicate an IO request since the original IO request may have been sent on a default path (e.g., 208a) that has degraded. The same unique sequence numbered duplicate IO request may be sent along another good path (e.g., 208b) to ensure the client device gets a response that is not delayed due to the degraded default path (e.g., 208a).

Figure 3A:
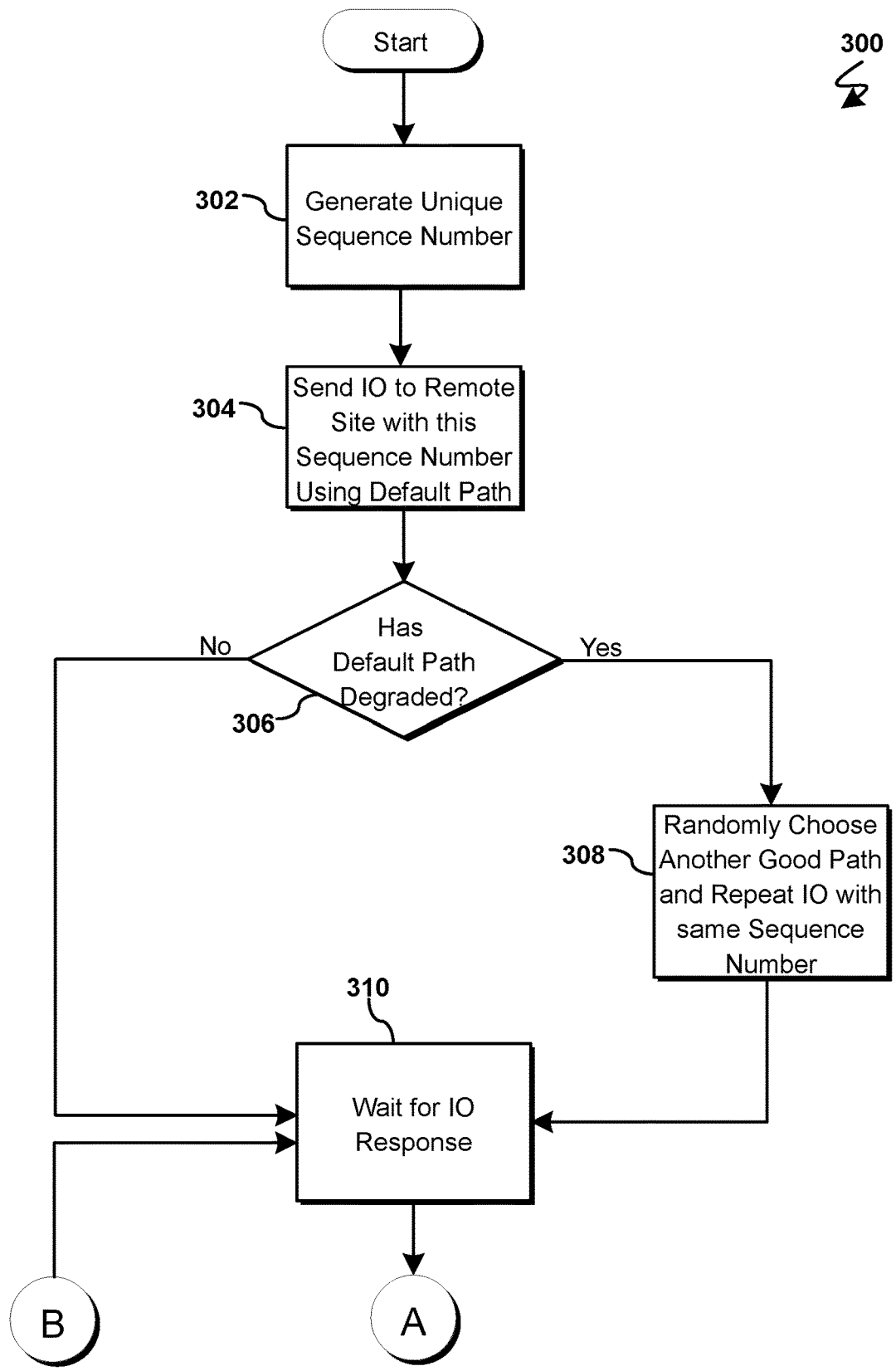
FIGS. 3A and 3B are operational flowcharts illustrating a degraded path health response process according to at least one embodiment.
Figure 3B:
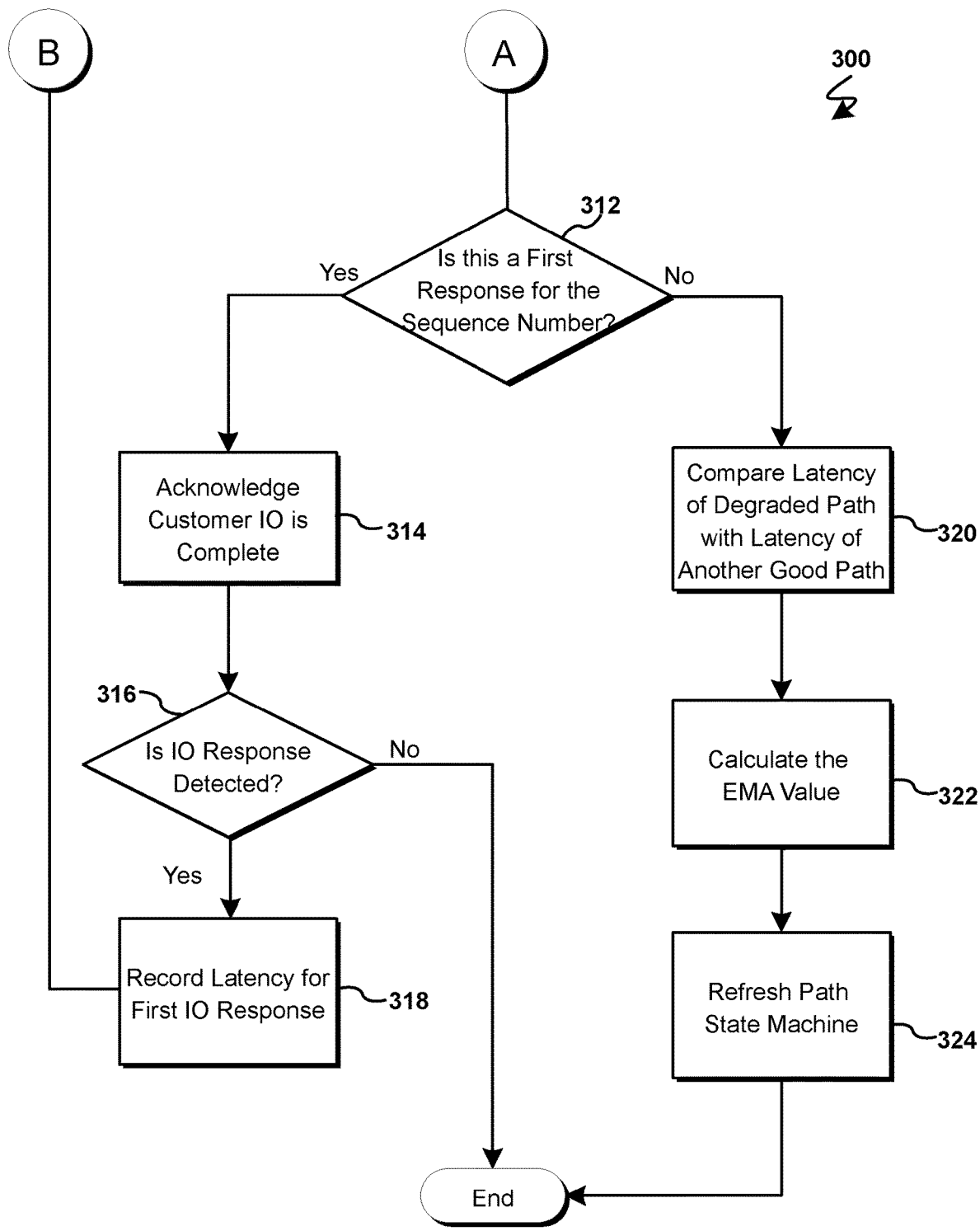

Referring now to FIGS. 3a and 3b, an operational flowchart illustrating a degraded path health response process 300 used by the path recovery program 110a, 110b according to at least one embodiment, is depicted.

At 302, the path recovery program 110a, 110b generates a unique sequence number. Generating a unique sequence number may be done using known methods such as a random non-repeating sequence number generator or a chronological non-repeating sequence number generator. A unique sequence number may be assigned to each IO request (e.g., write request) and may be used to determine if two IO requests are identical. An original IO request may utilize the default path 208a which may be functioning properly. Alternatively, a duplicated IO request may be used if a time-out on a default path 208a has occurred. The path recovery program 110a, 110b may utilize another good path 208b, other than the default path 208a, to send the IO request upon duplication. A duplicated IO request may have the same unique sequence number as the original IO request to indicate if the IO request has already been processed, therefore, the duplicated IO requests may not be processed twice. A unique IO sequence number may also be used to test the health state of an IO path (e.g., 208a-c). By creating a unique sequence number, the path recovery program 110a, 110b may use a mirror operation to send a duplicate IO request through a different path 208a-c if one path 208a-c becomes inoperable. For example, when a user enters a write IO request, the path recovery program 110a, 110b will generate unique sequence number 125773 and assign that unique sequence number 125773 to that specific write IO request.

Next, at 304, the path recovery program 110a, 110b will send the IO request to a remote site (e.g., 206) with this unique sequence number using a default path 208a. The path recovery program 110a, 110b may send the IO request from the primary storage device 204 to the secondary storage device 206 using the default path 208a that was previously in use. Additionally, the workload may be distributed evenly along the paths 208a-c in the network system 200. For example, the IO request with a unique sequence number will be sent to the mirrored secondary storage device 206 using the default path 208a that had been in use previously. In the case of multiple IO requests, the workload may be evenly distributed until one path 208a-c degrades, causing that IO request to slow down on the degraded path.

Then at 306, the path recovery program 110a, 110b determines if the default path 208a has degraded by not receiving a response within a preset threshold time. A path 208a-c that has degraded may indicate the path 208a-c is not functional enough to provide a normal IO operation without delaying the IO operation. To determine whether a path 208a-c has degraded, the path recovery program 110a, 110b may recognize latency on the default path 208a by a time-out where the threshold time has exceeded a set time period. Action may be taken at the first instance of a time-out to respond to a degraded path state. Taking action at the first time-out may allow the degraded path 208a to recover faster since the path recovery program 110a, 110b may begin to immediately use another good path 208b for IO operations. For example, if the preset threshold time is set at 2 seconds and no response is received within the 2 second threshold time, then the path 208a exceeds the threshold value and the path 208a is considered to be in a degraded state.

If the path recovery program 110a, 110b determined that the path 208a-c has degraded at 306, then the path recovery program 110a, 110b will randomly choose another good path 208b and repeat the IO operation with the same sequence number at 308. Once a degraded path 208a has been identified, the path recovery program 110a, 110b may begin duplicating IO operations and comparing latency response times between a good path (e.g., 208b) and a bad path (e.g., 208a). A duplicate IO operation may originate from many different hardware and software components, however, the same hardware and software components may be used in a duplicate IO operation for optimal latency calculations. If the hardware components or software components change from one IO operation to the next, that change may create different latencies within the network system which may affect the time-out operation. The path recovery program 110a, 110b may change the default path 208a being used for the duplicate IO operation instead of changing other hardware or software components. For example, if two different paths 208a, 208b are used for the same IO operation when the default path 208a has been degraded, then sending the duplicate unique IO request using another good path 208b will create an optimal IO response time for the user. The backend may involve the same disk or the same controller so difference in response time for the IO operation may be accurately calculated. The difference may be determined by comparing the response time (i.e., latency) of an alternate good path 208b with the response time of the degraded path 208a.

If the path recovery program 110a, 110b determined that the path has not degraded at 306, or if the path recovery program 110a, 110b randomly chose another good path 208b and repeated the IO request with the same sequence number at 308, then the path recovery program 110a, 110b will wait for the IO response at 310. The IO response received may correspond to the original IO request if the path 208a was not degraded or the duplicated IO request that was sent on another good path 208b if the default path 208a was determined to be degraded.

At 312, the path recovery program 110a, 110b determines if the response is a first in time response associated with the unique sequence numbered IO. The IO response received may correspond to the original IO request or may correspond to a duplicated IO request. The response time for each IO response may depend on the health of the path 208a-c. The path recovery program 110a, 110b may determine that an IO response corresponding to the unique sequence number is based on the sequence number of the response matching the unique sequence number. A first IO request and corresponding response may be determined by the path recovery program 110, 110b to be along the default path 208a that may be transmitting the IO operation normally (i.e., not in a degraded state). Alternatively, the duplicate IO request and corresponding response may be determined by the path recovery program 110a, 110b to be along another good path 208b if the default path 208a is in a degraded state. Subsequent IO responses having the unique sequence number (e.g., any IO response that is not the first IO response) received by the path recovery program 110a, 110b may not correspond to the first IO request and may result in a latency calculation. Receiving a subsequent unique sequence numbered duplicate IO response may indicate the default path 208a may have been degraded and the path recovery program 110a, 110b duplicated the IO request having the same sequence number as the original IO request. Further, the path recovery program 110a, 110b may have sent the duplicated IO request along another good path 208b, making the duplicated IO response the first IO response to arrive for the unique sequence number.

Continuing the example used previously, a user's write IO request with unique sequence number 125773 may be transmitted on the original default path 208a to the secondary storage device 206 when the path 208a may be in a good state. Thereafter, the secondary storage device 206 may perform the IO operation and generate and send an IO response having a sequence number 125773. Therefore, IO response 125773 may be the first and potentially only IO response to be received as no duplicate may be necessary if the path 208a is fully functional. If the path state of the original default path 208a is in a degraded state, the user's write IO request 125773 may be duplicated with the same sequence number (i.e., 125773) allowing the user's write IO request to be transferred through another good path 208b without any latency from the degraded path 208a. Therefore, the response corresponding to the duplicated write IO 125773 may be the first IO response to be received whereas the response corresponding to the original IO request 125773 may follow from the degraded path 208a and arrive later due to greater latency.

If the path recovery program 110a, 110b determined that this is a first response for the sequence number at 312, then the path recovery program 110a, 110b will acknowledge the customer IO is complete at 314. A first IO response from the default path 208a may be acknowledged by the path recovery program 110a, 110b indicating that the customer IO operation may be complete if the IO response is the first IO response received for the sequence number. Also, a duplicated IO response from the other good path 208b may be acknowledged by the path recovery program 110a, 110b indicating that the customer IO may be complete if the duplicated IO response is the first IO response received for the sequence number. For example, if a user initiates a write IO request and the path recovery program 110a, 110b sends the IO request on a healthy default path 208a, then the first IO response was handled and acknowledged as complete without any duplicate IO requests. Alternatively, if a user initiates a write IO request and the path recovery program 110a, 110b sends the IO request along a default path 208a that is in a degraded state, then the duplicated IO request will be generated and sent along a good path 208b, making the duplicated IO response the first response to be acknowledged and completed. The customer may receive the first acknowledgement whether the first IO response was derived from the first IO request or if the first IO response was derived from the duplicated IO request.

Then at 316, the path recovery program 110a, 110b determines if the response corresponding to the first IO request is detected. A detected IO response may be determined by which path 208a-c the IO request and corresponding response uses. The path recovery program 110a, 110b may detect an IO response that may be from another good path 208b and may not detect an IO response from the default path 208a. An undetected IO response received from a default path 208a can indicate the IO response may be complete and the default path 208a was functional for the first IO request. An undetected IO response ends the path recovery program 110a, 110b. For example, if a user initiates a write IO request when the default path 208a is fully functional, then the IO request utilized the default path 208a for the IO operation and the customer IO request may be complete, ending the path recovery program 110a, 110b. Alternatively, a write IO request sent from the user when the default path 208a is in a degraded state may cause the write IO request to be duplicated and sent along another good path 208b. Further, the degraded default path 208a may cause the duplicated IO response to be the first response received due to the original write IO request being slowed down on the default path 208a. Then the path recovery program 110a, 110b may acknowledge the IO response corresponding to the duplicate IO request sent on the other good path 208b as complete for the user and the duplicated IO response may be detected since the IO response used the other good path 208b. IO detection relates to which path 208a-c the IO request and corresponding response uses. Therefore, an IO response may be detected if the IO request was sent on another good path 208b and the IO response may not be detected if the IO request was sent on the default path 208a.

If the path recovery program 110a, 110b determined that the IO response is detected at 316, then the latency for the first IO response will be recorded at 318. The latency may be recorded in a data repository, such as a database 114, for an IO response that arrived on another good path 208b (i.e., the duplicated IO response). The IO response detection that occurred at 316 signals the path recovery program 110a, 110b to record the latency of path 208b and return to 310 to wait for another response from the default path 208a as the default path 208a was slower than another good path 208b for the first IO response. The health state of the default path 208a indicates the functionality of the default path 208a by measuring the latency with the same IO operation. For example, if the user sends a write IO request and the path recovery program 110a, 110b determines that the default path 208a has degraded, then the path recovery program 110a, 110b will send a duplicated IO request along another good path 208b, which may be subsequently detected as described previously at 316. The path recovery program 110a, 110b will then record the latency (e.g., a value indicating the difference between a time stamp indicating when the request is sent versus another time stamp indicating when the response is received) in a database 114 and then return to 310 to wait for another IO response.

If the path recovery program 110a, 110b determined at 312 that the received response does not correspond to the first response for the sequence number, then the path recovery program 110a, 110b will compare the latency of the degraded path 208a with the latency of another good path 208b at 320. Comparing the latency between the degraded path 208a with the latency of another good path 208b may show a time difference where the degraded path 208a corresponds to a slower IO response received and the other good path 208b corresponds to the faster IO response received. The original IO response may correspond to the IO request sent using the degraded path 208a while the duplicated IO response may correspond to the IO request sent using another good path 208b. Therefore, the original IO response may have a slower response time for the unique sequence number while the duplicate IO response may have a faster response time for the unique sequence number.

The latency on the path between the degraded path 208a and the other good path 208b may be calculated each time the unique sequence numbered IO response is received and may make subsequent latency recalculations until the degraded path 208a is determined to no longer be in a degraded state. The latency associated with each degraded path 208a may be compared to the latency of the same unique sequence IO response sent along another good path 208b that was previously detected. For example, a user who sends a write IO request through the path recovery program 110a, 110b will receive a complete acknowledged response regardless if the default path was fully functional or degraded due to the path recovery program's 110a, 110b ability to respond by sending the IO request through another good path 208b that may be fully functional. The path recovery program 110a, 110b may make subsequent latency calculations between the latency associated with another good path 208b and the latency associated with a degraded path 208a to determine when the degraded path 208a may no longer be in a degraded state, further allowing the path recovery program 110a, 110b to begin utilizing the default path 208a once the default path 208a may no longer be in a degraded state.

At 322, the path recovery program 110a, 110b calculates the EMA value between two paths 208a-c. The health state of one path 208a-c may be measured by using an Exponential Moving Average (EMA) calculation which may indicate the relative state of path health between one path (e.g., 208a) and all other paths (e.g., 208b and 208c) in the system. An EMA threshold calculation may be based on comparing the recorded latency from the detected IO response on another good path 208b previously described at 318 and the second IO response on the degraded path 208a. When all the paths have the same performance or health state, the EMA may be 100%, however, a reasonable real world deviation may define the threshold EMA to be approximately 110%, allowing a tolerance of approximately 10% performance deviation among the paths.

Then at 324, the path recovery program 110a, 110b will refresh the path state machine. The refresh is based on the EMA threshold value. The path state machine may be refreshed to reflect the current health state of the path 208a-c as will be described in detail below with reference to FIG. 4.

Figure 4:
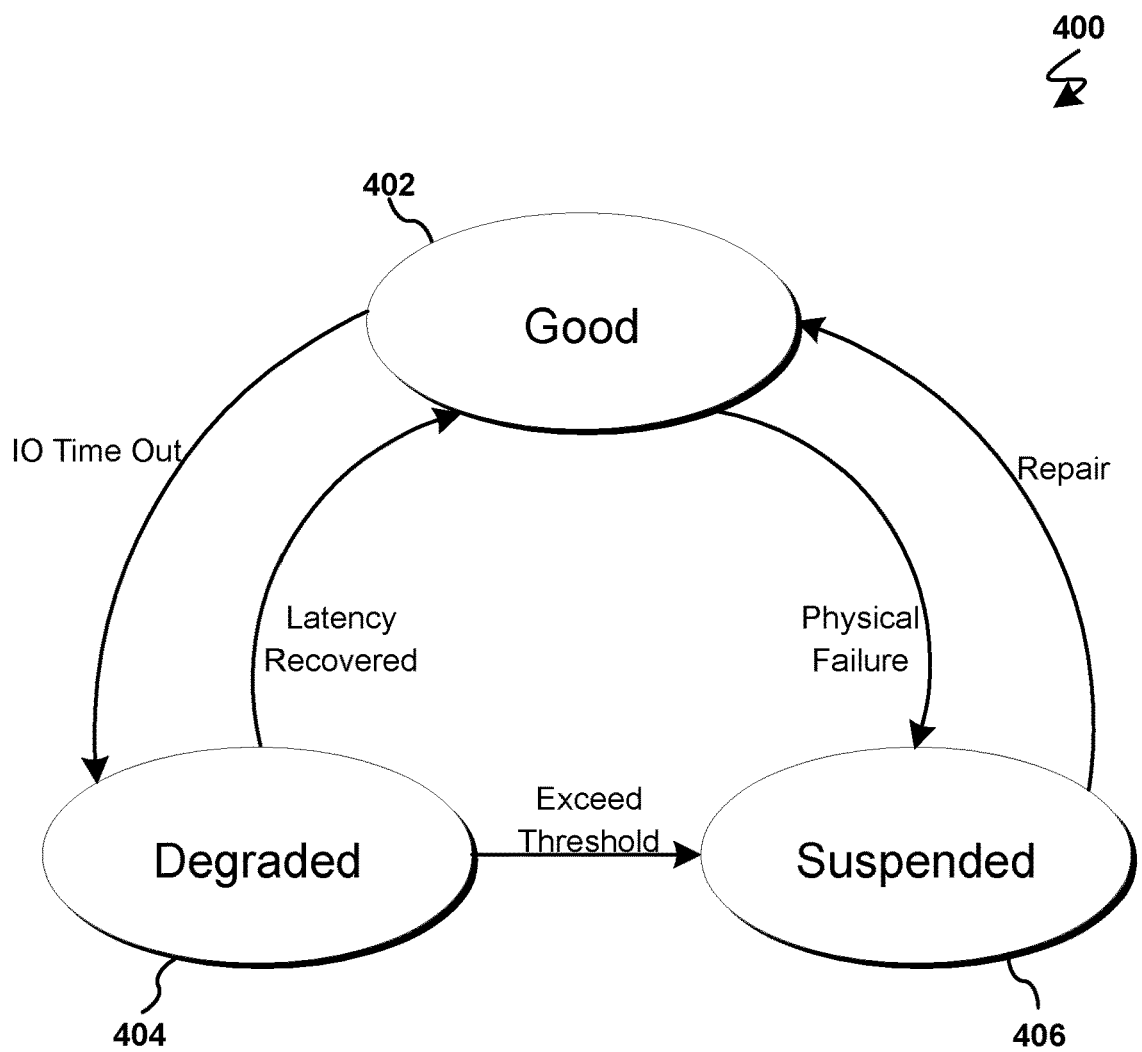
FIG. 4 is a state diagram illustrating a path state machine according to at least one embodiment.

Referring now to FIG. 4, a state diagram illustrating a path state machine 400 that represents three health states of a path 208a-c between the primary storage device 204 and the secondary storage device 206 according to at least one embodiment. The path health states represented within the path state machine 400 may include a good path state 402, a degraded path state 404 and a suspended path state 406.

Each instance of the path state machine 400 may be handled by the path recovery program 110a, 110b on the primary storage device 204. Each path 208a-c may have a corresponding instance of a path state machine 400 where the default state may be a good path state 402. A good path state 402 may indicate that the corresponding path 208a-c may be fully functional. A degraded path state 404 may indicate that the corresponding path 208a-c may not provide sufficient performance for normal IO operations. A suspended path state 406 may indicate that the corresponding path 208a-c may be in a suspended state where the path 208a-c has failed and needs repair before reuse since the IO operation may not reach the targeted destination. The path state may be detected based on system threshold differences such as when the path 208a-c times-out and through latency calculations.

The path recovery program 110a, 110b may transition the current path state of a path 208a-c from a good state 402 to a degraded state 404 once an IO operation time-out has occurred. Time-out can occur when the latency of one IO operation exceeds a threshold time (e.g., 2 seconds for an Online Transaction Processing (OLTP) application). Thus, the path recovery program 110a, 110b may determine that a path 208a-c that has a 2 second latency exceeds the time-out threshold and is performing poorly, thus the current path state may transition into a degraded path state 404. Thereafter, another IO path 208b may be chosen as described previously at 308, that may allow the degraded path 208a to be bypassed by sending the duplicate IO request using another good path 208b. For example, if a user write IO request is sent along the default path 208a and the default path 208a is slow enough to exceed a threshold time, then the duplicate write IO response will return to the primary storage device 204 while the slower write IO response latency time will be used in a calculation by the path recovery program 110a, 110b. In another example, if the latency calculation for the slower write IO is determined by the path recovery program 110a, 110b to exceed 2 seconds, then the current path state of the default path 208a will transition to a degraded path state 404. Subsequently, the degraded path 208a state will either transition to a good path state 402 if the latency is recovered or will transition to a suspended path state 406 if the IO operation exceeds a threshold.

The path recovery program 110a, 110b may transition the current path state of a path 208a-c from a degraded state 404 to a suspended state 406 when the threshold on the degraded state 404 has been exceeded for a predetermined period of time. Similarly, if the path recovery program 110a, 110b determines the degraded state 404 cannot be recovered, then the current path state of the path state machine 400 may transition to a suspended state 406. An example of the exceeded threshold may be calculated by the EMA value. The value resulting from the EMA calculation value may assist in determining the health state of a path 208a-c. When determining the EMA value to check whether a path state threshold has changed, the path recovery program 110a, 110b may compare the latency between two paths 208a-c. The Latency Index calculation may be shown by LatencyIndex=latency_on_degrade_path/latency_on_good_path.

For example, once the path recovery program 110a, 110b has determined the path 208a-c is in a degraded state 404 for a period of time, such as 3 seconds, then the current path state of the path 208a-c will transition to a suspended path state 406. A path 208a-c is considered to be suspended once the path recovery program 110a, 110b can detect the path 208a-c is positioned to fail by exceeding the EMA threshold for a period of time (e.g., 3 seconds) or if physical failure happens on the path 208a-c.

From a suspended state 406, the path recovery program 110a, 110b may transition the current path state of a path 208a-c to a good state 402 by repairing the path 208a-c. Repairing a path 208a-c from a suspended state 406 to a good state 402 may consist of replacing the network link or some other reset of the link if a normal recovery action is to manually reset the link.

The path recovery program 110a, 110b may transition the current path state of a path 208a-c from a degraded state 404 to a good state 402 by determining the latency has recovered. Determining whether the latency has recovered for the path state machine 400 to transition the current path state from a degraded state 404 to a good state 402 may be calculated by using the Exponential Moving Average (EMA) value for latency. An example of latency recovering could be determined when the EMA latency value drops to near 100% (e.g., 110%) and at least a certain number of IO operations are monitored (e.g., 500 IO operations), then the path 208a-c may be functioning optimally and the current path state may be updated to be a good path state 402 to reflect the current state of the path 208a-c. A decision window may be used to monitor the number of IO operation requests (e.g., N requests) to show the path state stability for a period of time. To avoid spike issues when recovering latency, the path recovery program 110a, 110b may calculate the EMA as follows:

$$EMA_{new}=\alpha*LatencyIndex_{new}+(1-\alpha)*EMA_{now}$$

where $\alpha=2/(N+1)$ and N may be the count of IO operations that may be monitored before determining the adjustment of the path state. A 100% EMA value for a number of continuous IO request operations can show that the path 208a-c has nearly the same latency compared to other paths 208a-c, thus the path 208a-c may be determined to be in a good state 402. Upon determining another IO time-out, the EMA calculation may be used again to determine the current path state. For example, when an IO request on a path 208a-c has exceeded a predefined percentage (e.g., 95%) within a time window (e.g., 3 minutes) and when no time-out occurred on the path for a specific period of time (e.g., 5 minutes), the current path state of the path 208a-c may transition from a degraded state 404 to a good state 402.

The path recovery program 110a, 110b may transition the current path state of a path 208a-c from a good state 402 to a suspended state 406 if physical failure on the device occurs. For example, if a port is backlogged or if a physical failure is present, then the current path state will transition from a good state 402 to a suspended state 406 which will need to be repaired to return to a good state 402 again.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
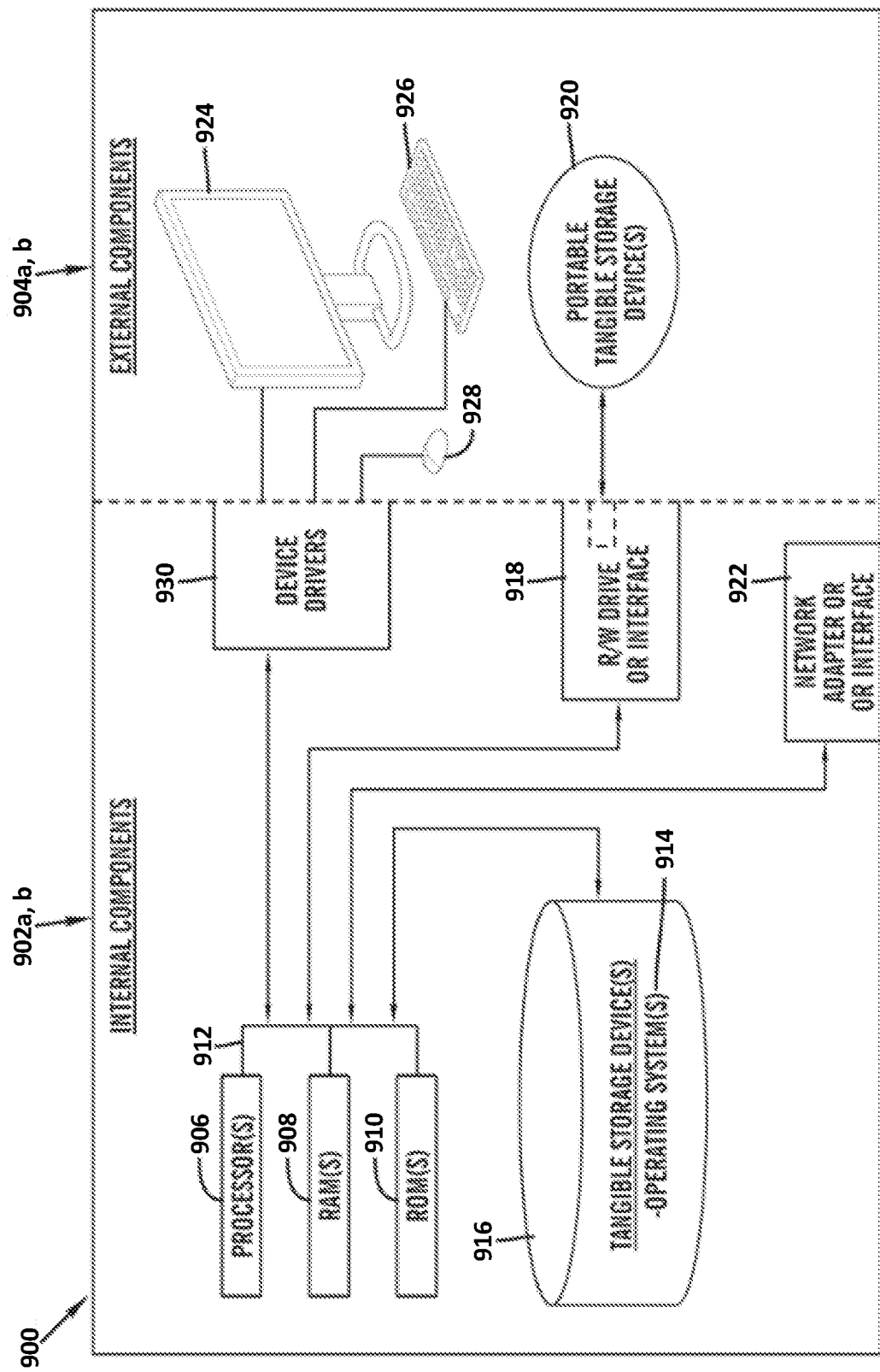
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the path recovery program 110a in client computer 102, and the path recovery program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the path recovery program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the path recovery program 110a in client computer 102 and the path recovery program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the path recovery program 110a in client computer 102 and the path recovery program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
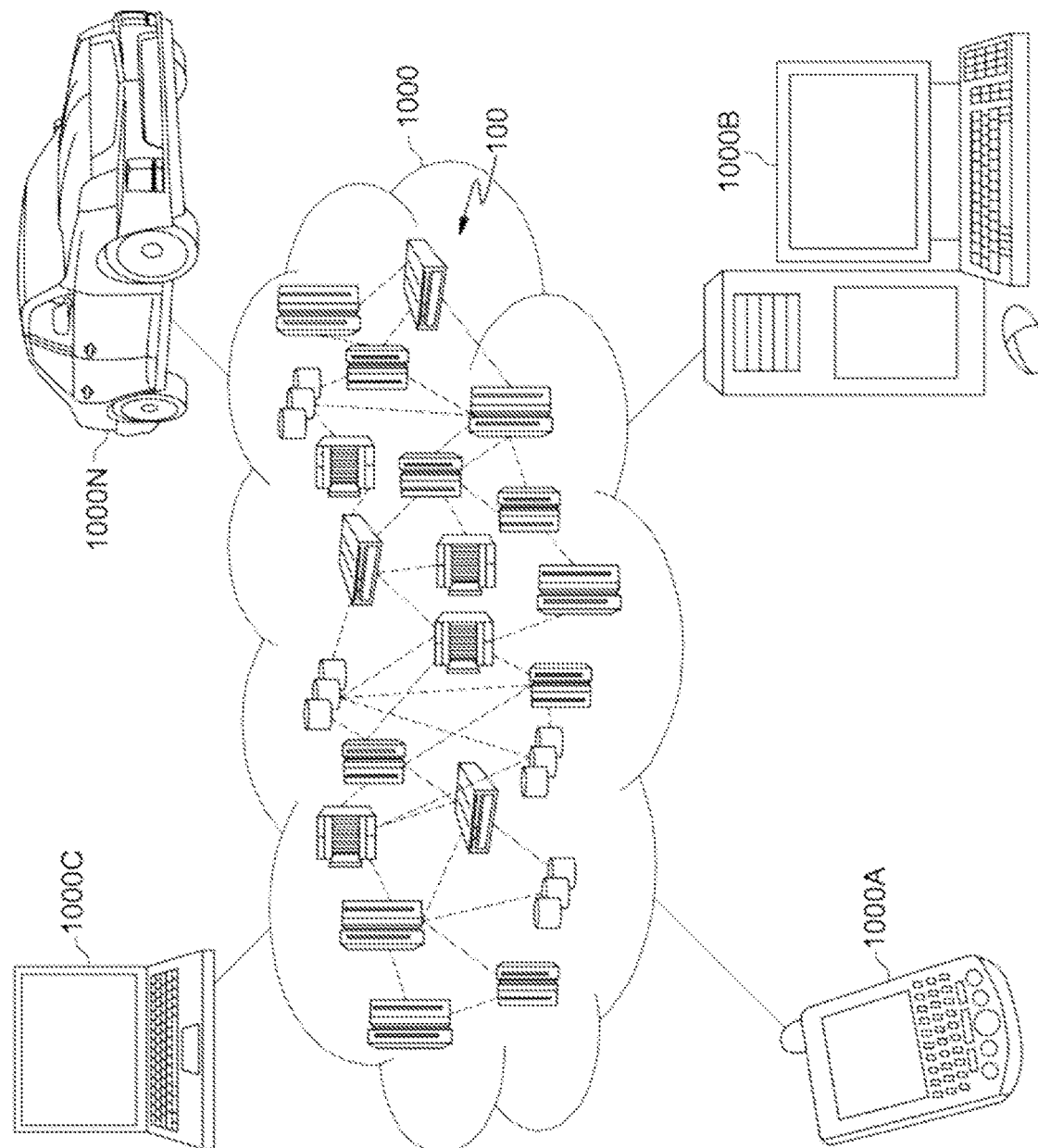
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
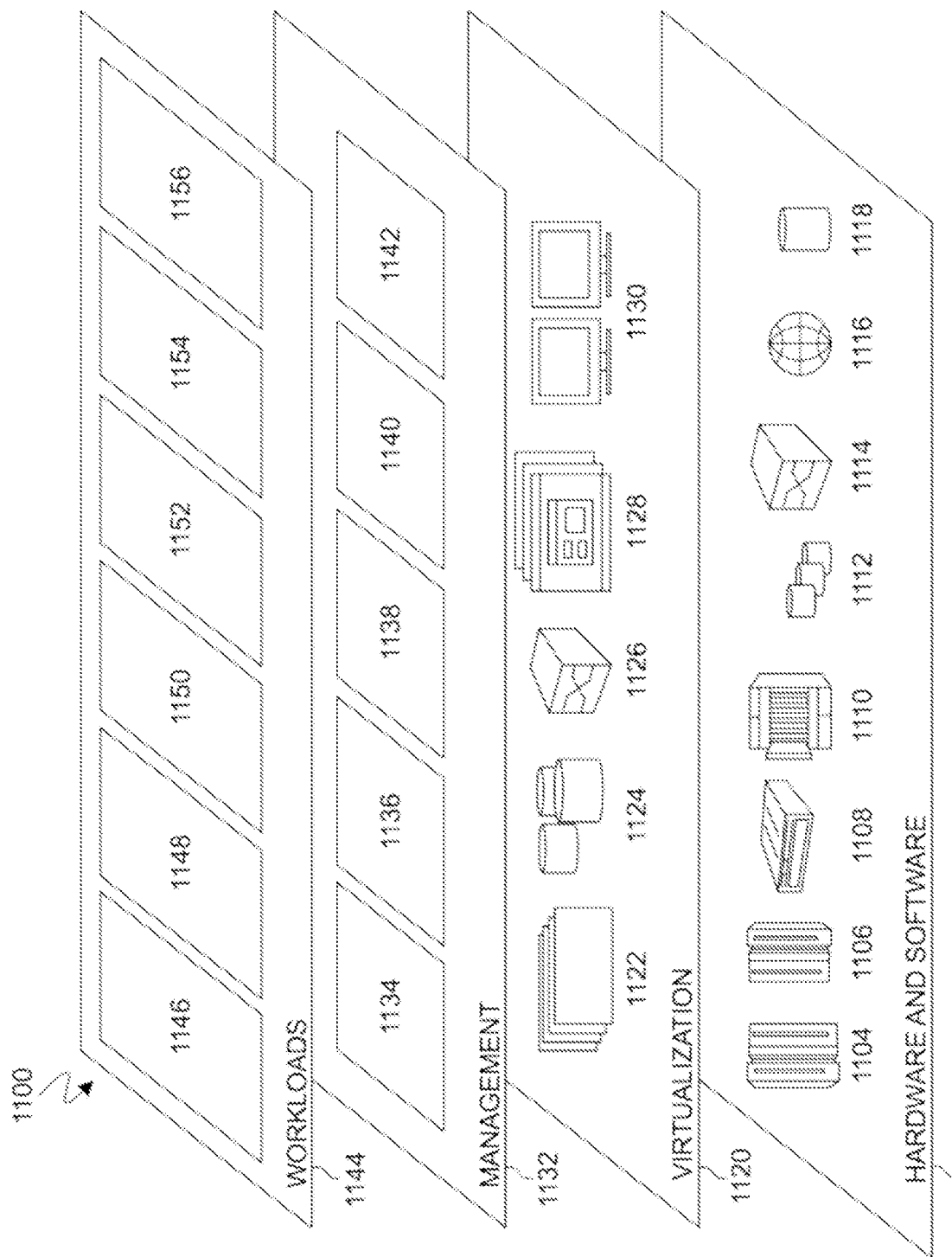
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and path recovery 1156. A path recovery program 110a, 110b provides a way to send and receive IO operations timely in the event of path failure. The path recovery program 110a, 110b has the capability of determining the path health to ensure the IO operations are not slowed down even if one path is not performing optimally.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining path health to conduct a plurality of Input-Output (TO) operations along a healthy path in a network, the method comprising:
sending an original IO request on a first path from a primary site to a secondary site;
determining a first IO response associated with the sent original IO request has exceeded a threshold time on the first path between the primary site and the secondary site;

generating a duplicate IO request based on the exceeded threshold time for a response on the first path between the primary site and the secondary site;
sending the generated duplicate IO request on a second path;
receiving a second IO response associated with the sent duplicate IO request on the second path;
receiving the first IO response associated with the original IO request on the first path;
determining that the first IO response was received on the first path after the second IO response was received on the second path; and
determining a health state associated with the first path based on determining that the first IO response was received on the first path after the second IO response was received on the second path.

2. The method of claim 1, further comprising:
generating a unique sequence number for the received original IO request at the primary site;
assigning a generated unique sequence number to the received original IO request;
assigning the generated unique sequence number to the generated duplicate IO request; and
determining that a first sequence number associated with the first IO response and a second sequence number associated with the second IO response matches the generated unique sequence number.

3. The method of claim 1, wherein determining the health state of the path further comprises:
comparing a first latency of the first IO response with a second latency of the second IO response; and
calculating an average time difference between the second IO response and the first IO response based on comparing a first latency of the first IO response with a second latency of the second IO response.

4. The method of claim 1, wherein the path state machine is a first path state machine associated with the first path, and wherein a second path state machine is associated with the second path.

5. The method of claim 3, wherein calculating the average time difference further comprises:
comparing the second latency of the second IO response with the first latency of the first IO response using a latency index;
calculating an Exponential Moving Average (EMA) based on the latency index;
determining that the calculated EMA has exceeded an EMA threshold; and
adjusting the health state indicated by the path state machine from a good path state to a degraded path state based on determining that the calculated EMA has exceeded the EMA threshold.

6. The method of claim 5, wherein the latency index is calculated by LatencyIndex=latency_on_degrade_path/latency_on_good_path, wherein the latency_on_degrade_path is associated with the first path, and wherein the latency_on_good_path is associated with the second path.

7. The method of claim 5, wherein the EMA is calculated by $EMA_{new}=\alpha*LatencyIndex_{new}+(1-\alpha)*EMA_{now}$, wherein $\alpha=2/(N+1)$, and wherein N represents a count of IO operations that are monitored before determining to adjust the health state associated with the first path.

8. A computer system for determining path health to conduct a plurality of Input-Output (TO) operations along a healthy path in a network, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
sending an original IO request on a first path from a primary site to a secondary site;
determining a first IO response associated with the sent original IO request has exceeded a threshold time on the first path between the primary site and the secondary site;
generating a duplicate IO request based on the exceeded threshold time for a response on the first path between the primary site and the secondary site;
sending the generated duplicate IO request on a second path;
receiving a second IO response associated with the sent duplicate IO request on the second path;
receiving the first IO response associated with the original IO request on the first path;
determining that the first IO response was received on the first path after the second IO response was received on the second path; and
determining a health state associated with the first path based on determining that the first IO response was received on the first path after the second IO response was received on the second path.

9. The computer system of claim 8, further comprising:
generating a unique sequence number for the received original IO request at the primary site;
assigning a generated unique sequence number to the received original IO request;
assigning the generated unique sequence number to the generated duplicate IO request; and
determining that a first sequence number associated with the first IO response and a second sequence number associated with the second IO response matches the generated unique sequence number.

10. The computer system of claim 8, wherein determining the health state of the path further comprises:
comparing a first latency of the first IO response with a second latency of the second IO response; and
calculating an average time difference between the second IO response and the first IO response based on comparing a first latency of the first IO response with a second latency of the second IO response.

11. The computer system of claim 8, wherein the path state machine is a first path state machine associated with the first path, and wherein a second path state machine is associated with the second path.

12. The computer system of claim 10, wherein calculating the average time difference further comprises:
comparing the second latency of the second IO response with the first latency of the first IO response using a latency index;
calculating an Exponential Moving Average (EMA) based on the latency index;
determining that the calculated EMA has exceeded an EMA threshold; and
adjusting the health state indicated by the path state machine from a good path state to a degraded path state based on determining that the calculated EMA has exceeded the EMA threshold.

13. The computer system of claim 12, wherein the latency index is calculated by LatencyIndex=latency_on_degrade_path/latency_on_good_ path, wherein the latency_on_degrade_path is associated with the first path, and wherein the latency_on_good_path is associated with the second path.

14. The computer system of claim 12, wherein the EMA is calculated by $EMA_{new}=\alpha*LatencyIndex_{new}+(1-\alpha)*EMA_{now}$, wherein $\alpha=2/(N+1)$, and wherein N represents a count of IO operations that are monitored before determining to adjust the health state associated with the first path.

15. A computer program product for determining path health to conduct a plurality of Input-Output (TO) operations along a healthy path in a network, comprising:
  one or more computer-readable storage medium and program instructions stored on at least one of the one or more tangible storage medium, the program instructions executable by a processor, the program instructions comprising:
  program instructions to send an original IO request on a first path from a primary site to a secondary site;
  program instructions to determine a first IO response associated with the sent original IO request has exceeded a threshold time on the first path between the primary site and the secondary site;
  program instructions to generate a duplicate IO request based on the exceeded threshold time for a response on the first path between the primary site and the secondary site;
  program instructions to send the generated duplicate IO request on a second path;
  program instructions to receive a second IO response associated with the sent duplicate IO request on the second path;
  program instructions to receive the first IO response associated with the original IO request on the first path;
  program instructions to determine that the first IO response was received on the first path after the second IO response was received on the second path; and
  program instructions to determine a health state associated with the first path based on determining that the first IO response was received on the first path after the second IO response was received on the second path.

16. The computer program product of claim 15, further comprising:
  generating a unique sequence number for the received original IO request at the primary site;
  assigning a generated unique sequence number to the received original IO request;
  assigning the generated unique sequence number to the generated duplicate IO request; and
  determining that a first sequence number associated with the first IO response and a second sequence number associated with the second IO response matches the generated unique sequence number.

17. The computer program product of claim 15, wherein determining the health state of the path further comprises:
  comparing a first latency of the first IO response with a second latency of the second IO response; and
  calculating an average time difference between the second IO response and the first IO response based on comparing a first latency of the first IO response with a second latency of the second IO response.

18. The computer program product of claim 15, wherein the path state machine is a first path state machine associated with the first path, and wherein a second path state machine is associated with the second path.

19. The computer program product of claim 17, wherein calculating the average time difference further comprises:
  comparing the second latency of the second IO response with the first latency of the first IO response using a latency index;
  calculating an Exponential Moving Average (EMA) based on the latency index;
  determining that the calculated EMA has exceeded an EMA threshold; and
  adjusting the health state indicated by the path state machine from a good path state to a degraded path state based on determining that the calculated EMA has exceeded the EMA threshold.

20. The computer program product of claim 19, wherein the latency index is calculated by LatencyIndex=latency_on_degrade_path/latency_on_good_path, wherein the latency_on_degrade_path is associated with the first path, and wherein the latency_on_good_path is associated with the second path.

\* \* \* \* \*